United States Patent
Sung

(10) Patent No.: US 11,493,015 B2
(45) Date of Patent: Nov. 8, 2022

(54) WAVE POWER GENERATION SYSTEM AND METHOD FOR CONTROLLING SAME

(71) Applicant: INGINE, INC., Seoul (KR)

(72) Inventor: Yong Jun Sung, Seoul (KR)

(73) Assignee: INGINE, INC., Seoul (KR)

( * ) Notice: Subject to any disclaimer, the term of this patent is extended or adjusted under 35 U.S.C. 154(b) by 0 days.

(21) Appl. No.: 16/978,708

(22) PCT Filed: Mar. 8, 2019

(86) PCT No.: PCT/KR2019/002727
§ 371 (c)(1),
(2) Date: Sep. 6, 2020

(87) PCT Pub. No.: WO2019/172706
PCT Pub. Date: Sep. 12, 2019

(65) Prior Publication Data
US 2021/0095633 A1   Apr. 1, 2021

(30) Foreign Application Priority Data

Mar. 9, 2018   (KR) .......................... 10-2018-0028032

(51) Int. Cl.
*F03B 13/18* (2006.01)
*F03G 3/08* (2006.01)

(52) U.S. Cl.
CPC ............ *F03B 13/18* (2013.01); *F03B 13/189* (2013.01); *F03B 13/1855* (2013.01);
(Continued)

(58) Field of Classification Search
CPC .......... F03B 13/12; F03B 13/14; F03B 13/16; F03B 13/18; F03B 13/1805; F03B 13/181;
(Continued)

(56) References Cited

U.S. PATENT DOCUMENTS

2011/0308244 A1* 12/2011 Findlay ................... F03B 13/16
60/500
2012/0247098 A1* 10/2012 Stewart ................... F03B 11/00
60/501
(Continued)

FOREIGN PATENT DOCUMENTS

CN   101737241   6/2010
CN   101865071   10/2010
(Continued)

OTHER PUBLICATIONS

"International Search Report (Form PCT/ISA/210) of PCT/KR2019/002727," dated Jun. 11, 2019, with English translation thereof, pp. 1-4.

*Primary Examiner* — Mickey H France
(74) *Attorney, Agent, or Firm* — JCIPRNET

(57) ABSTRACT

Disclosed are a wave power generation system for generating electrical energy by means of a hydraulic circuit, and a method for controlling same. The wave power generation system comprises a hydraulic motor for storing motion energy in a form of fluid pressure and volume if a plurality of tension transmission members, for transmitting motion energy by means of six-degrees-of-freedom motion of a movable object floating on the waves, move in one direction, and for maintaining the tension of the tension transmission members by means of the stored energy if the tension transmission members move in the other direction. Electric energy is alternately generated by means of the bidirectional motion of the plurality of tension transmission members.

8 Claims, 3 Drawing Sheets

(52) U.S. Cl.
CPC ............ *F03B 13/1885* (2013.01); *F03G 3/08* (2013.01); *Y02E 10/30* (2013.01)

(58) Field of Classification Search
CPC ................. F03B 13/182; F03B 13/1845; F03B 13/1855; F03B 13/186; F03B 13/187; F03B 13/1885; F03B 13/189; F03B 13/1895
USPC ................................ 60/495–507; 290/42, 53
See application file for complete search history.

(56) References Cited

U.S. PATENT DOCUMENTS

| | | | |
|---|---|---|---|
| 2015/0000263 A1 | 1/2015 | Foster | |
| 2015/0035283 A1* | 2/2015 | Lee | F16D 41/12 290/53 |
| 2016/0215751 A1* | 7/2016 | Sung | F03B 13/1885 |
| 2019/0063395 A1* | 2/2019 | Hagmuller | F03B 17/02 |
| 2021/0095633 A1 | 4/2021 | Sung | |

FOREIGN PATENT DOCUMENTS

| | | | |
|---|---|---|---|
| CN | 102345553 | 2/2012 | |
| CN | 103089527 | 5/2013 | |
| CN | 105840401 | 8/2016 | |
| CN | 106870262 | 6/2017 | |
| EP | 2128430 | 12/2009 | |
| JP | 2006189018 | 7/2006 | |
| JP | 5260092 | 8/2013 | |
| JP | 2014506659 | 3/2014 | |
| JP | 2014509715 | 4/2014 | |
| JP | 2016521819 | 7/2016 | |
| KR | 20090126846 | 12/2009 | |
| KR | 101049518 | 7/2011 | |
| KR | 20130074001 | 7/2013 | |
| KR | 20150120896 | 10/2015 | |
| KR | 101732243 | 5/2017 | |
| KR | 20170084891 | 7/2017 | |
| WO | 2010044674 | 4/2010 | |
| WO | WO-2010067341 A2 * | 6/2010 | .......... F03B 13/1885 |
| WO | WO-2016111461 A1 * | 7/2016 | ............ B63B 22/18 |
| WO | 2017122839 | 7/2017 | |
| WO | 2017142169 | 8/2017 | |

* cited by examiner

WAVE POWER GENERATION SYSTEM AND METHOD FOR CONTROLLING SAME

TECHNICAL FIELD

The following description relates to a wave power generation system and a method of controlling the wave power generation system.

BACKGROUND ART

Generally, power generation methods of generating electricity include, for example, hydroelectric power generation, thermal power generation, nuclear power generation, and the like, and such power generation methods require large-scale power generation facilities. In addition, in the case of thermal power generation, since a huge amount of petroleum or coal energy needs to be supplied in order to operate power generation facilities, many difficulties are predicted at the present time when petroleum and coal resources are depleted, and pollution also becomes a big issue. Also, in the case of nuclear power generation, a radiation leakage and nuclear waste disposal are serious. Since a fall head of water is used in the hydroelectric power generation, a large-scale dam needs to be constructed, which leads to a change in surrounding environments. Also, the hydroelectric power generation has environmental constraints that a river with abundant water resources needs to be assumed for a dam construction. Thus, there is a demand for groundbreaking power generation methods that are cheaper, safer, and more environmentally friendly than the above general power generation methods, and one of them is wave power generation capable of generating electric energy using movement of waves.

Attention has been focused on tidal power generation for generating electric energy using a tidal range, tidal stream power generation for generating electric energy using a high flow rate of seawater, and wave power generation for generating electric energy using movement of waves. In particular, the wave power generation is a technology of generating electric energy based on constant movement of waves, and may continue to generate energy. The wave power generation converts a back-and-forth motion of water particles and a periodic vertical motion of the sea level due to waves into a mechanical rotational motion or an axial motion through an energy conversion device, and then into electric energy. Wave power generation methods may be classified into a variety of kinds according to a primary energy conversion method based on a wave height, and a representative method is a movable object type method of operating an electric generator in response to a vertical motion or a rotational motion of a buoy floating on a water surface by movement of waves.

The movable object type method is a method of receiving movement of an object, for example, a buoy, that moves based on movement of waves, converting the movement into a reciprocating or rotational motion, and generating electric power using an electric generator, and an example thereof is disclosed in Korean Patent Application Publication No. 10-2015-00120896 or Japanese Patent Registration No. 5260092.

However, irregular kinetic energy is provided due to characteristics of waves. Therefore, to stably generate energy, there is a demand for a system and a control method for generating effective electric energy in a motion transmission portion that transmits wave energy, and a hydraulic motor that converts received kinetic energy into rotational kinetic energy used for power generation.

The above description has been possessed or acquired by the inventor(s) in the course of conceiving the present invention and is not necessarily an art publicly known before the present application is filed.

DISCLOSURE OF INVENTION

Technical Goals

Example embodiments provide a control system and method of a wave power generation facility that may enhance an energy conversion efficiency and that may have a high degree of control freedom.

Problems to be solved in the example embodiments are not limited to the aforementioned problems, and other problems not mentioned herein can be clearly understood by those skilled in the art from the following description.

Technical Solutions

According to example embodiments to solve the foregoing problems, a wave power generation system includes a hydraulic motor that is configured to store kinetic energy in forms of a fluid pressure and volume when a plurality of tension transmission members configured to transmit kinetic energy by a six-degrees-of-freedom motion of a movable object floating on waves move in one direction, and that is configured to maintain a tension of the tension transmission members by the stored energy when the tension transmission members move in another direction, wherein electric energy is alternately generated by a bidirectional motion of the plurality of tension transmission members.

According to one aspect, the transmission members may be connected to a converting body, the hydraulic motor may be connected to one side of the converting body, and a power generation unit may be connected to another side of the converting body. A tank configured to store a fluid and a pressure accumulator configured to store the fluid may be provided in the hydraulic motor. When the tension transmission members are pulled, the hydraulic motor may rotate in one direction and may allow a fluid to flow from the tank to the pressure accumulator. When the tension transmission members are not pulled, a fluid may flow from the pressure accumulator to the tank, so that the hydraulic motor may rotate in an opposite direction.

According to one aspect, accelerators configured to increase a rotational speed of the converting body may be included. The accelerators may be disposed between the converting body and the hydraulic motor, and between the converting body and the power generation unit, respectively.

According to one aspect, a flywheel may be provided in the power generation unit.

According to one aspect, the tension transmission members connected to at least three portions of the movable object may be provided. A hydraulic motor may be provided in each of the tension transmission members. The tension transmission members may be connected to one hydraulic motor.

According to example embodiments to solve the foregoing problems, a wave power generation system includes, a movable object that moves by waves while floating on the waves, a motion transmission unit including tension transmission members that are connected to at least three portions of the movable object to enable a six degrees-of-freedom motion of the movable object and that are configured to transmit kinetic energy of the movable object in one direction, a converting body connected to the tension transmission members, a hydraulic motor disposed on one side of the converting body, and a power generation unit disposed on another side of the converting body, wherein when the tension transmission members are pulled, the hydraulic motor rotates in one direction and allows a fluid to flow from a tank to a pressure accumulator, and wherein when the tension transmission members are not pulled, a fluid flows from the pressure accumulator to the tank, so that the hydraulic motor rotates in an opposite direction and a tension of the tension transmission members connected to the converting body is maintained.

According to one aspect, accelerators configured to increase a rotational speed of the converting body may be provided. The accelerators may be disposed between the converting body and the hydraulic motor, and between the converting body and the power generation unit, respectively.

According to example embodiments to solve the foregoing problems, a method of controlling a wave power generation system includes storing a fluid flowing from a tank to a pressure accumulator in response to a hydraulic motor rotating in one direction when a tension is applied to a tension transmission member by a six degrees-of-freedom motion of a movable object floating on waves, maintaining the tension of the tension transmission member in response to the hydraulic motor moving in an opposite direction based on movement of the fluid from the pressure accumulator to the tank when the tension is not applied in the tension transmission member, and alternately generating electric energy by the tension applied to the tension transmission member by a motion of the movable object, and by the tension applied to the tension transmission member by the hydraulic motor.

Effects

As described above, according to example embodiments, kinetic energy of a movable object moving in one direction may be stored in forms of a pressure and volume of a fluid by a hydraulic motor, and a tension of a tension transmission member may be maintained when the movable object moves in another direction. Also, a power generation unit may alternately generate electric energy by a tension applied by the movable object and a tension applied by the hydraulic motor.

The effects of the wave power generation system and a method of controlling the wave power generation system are not limited to the aforementioned effects, and other unmentioned effects can be clearly understood by those skilled in the art from the following description.

BRIEF DESCRIPTION OF DRAWINGS

The accompanying drawings illustrate example embodiments of the present invention and, together with the detailed description of the invention, serve to provide further understanding of the technical idea of the present invention. However, the present invention is not to be construed as being limited to the drawings.

BEST MODE FOR CARRYING OUT THE INVENTION

Figure 1:
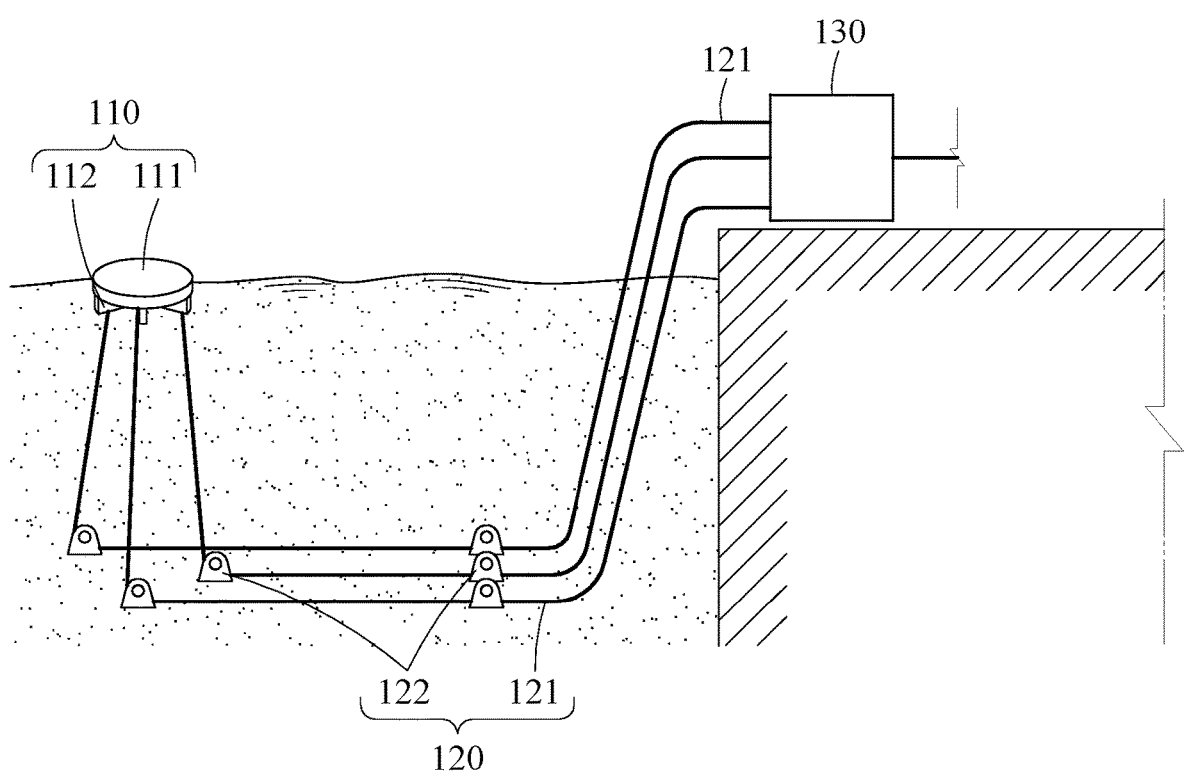
FIG. 1 is a diagram illustrating a concept of a wave power generation system according to an example embodiment.

Hereinafter, example embodiments will be described in detail with reference to the illustrative drawings. In denoting reference numerals to constituent elements of the respective drawings, it should be noted that the same constituent elements will be designated by the same reference numerals, if possible, even though the constituent elements are illustrated in different drawings. Further, in the following description of the example embodiments, a detailed description of publicly known configurations or functions incorporated herein will be omitted when it is determined that the detailed description obscures the subject matters of the example embodiments.

In addition, the terms first, second, A, B, (a), and (b) may be used to describe components of the example embodiments. These terms are used only for the purpose of discriminating one component from another component, and the nature, the sequences, or the orders of the components are not limited by the terms. When one component is described as being "connected", "coupled", or "joined" to another component, it should be understood that one component can be connected or attached directly to another component, and an intervening component can also be "connected", "coupled", or "joined" to the components.

Figure 2:
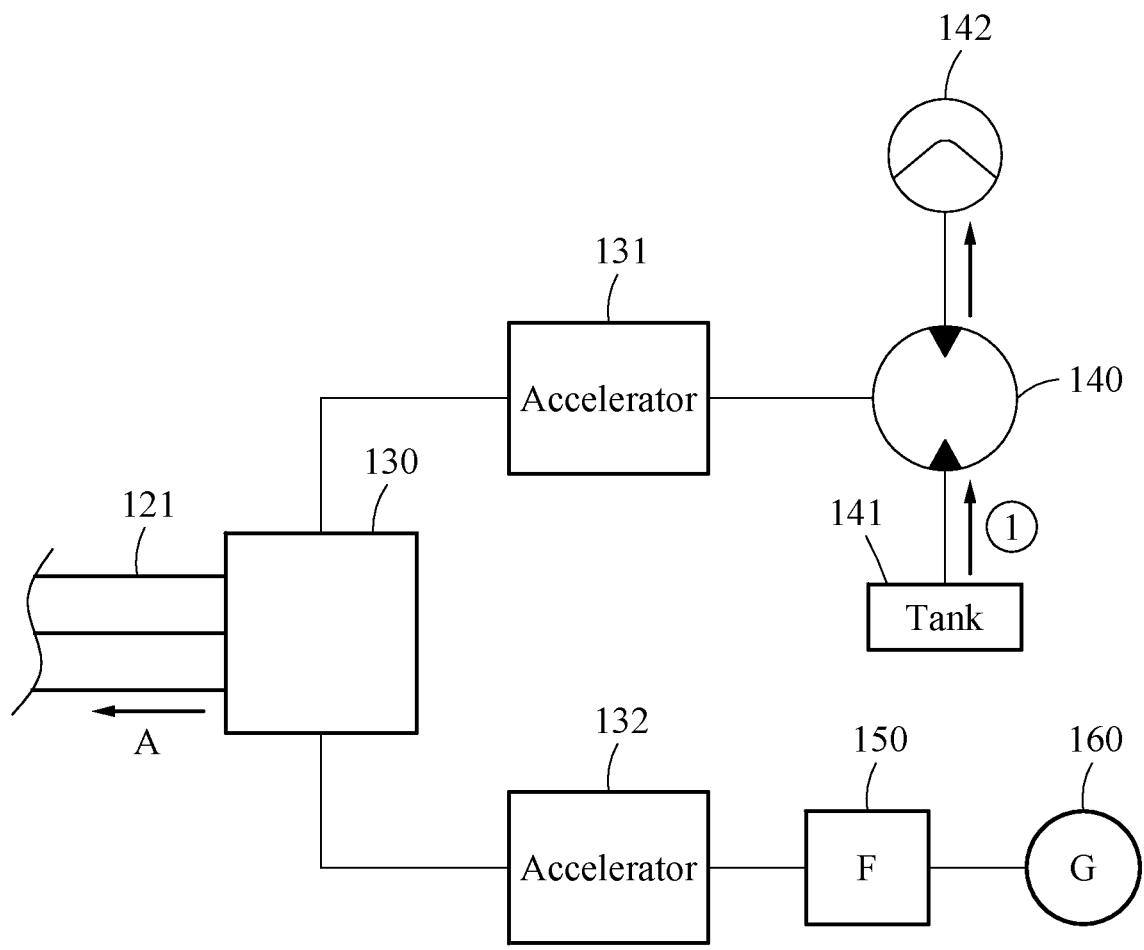
FIGS. 2 and 3 are block diagrams illustrating a configuration and an operation of the wave power generation system of FIG. 1.
Figure 3:
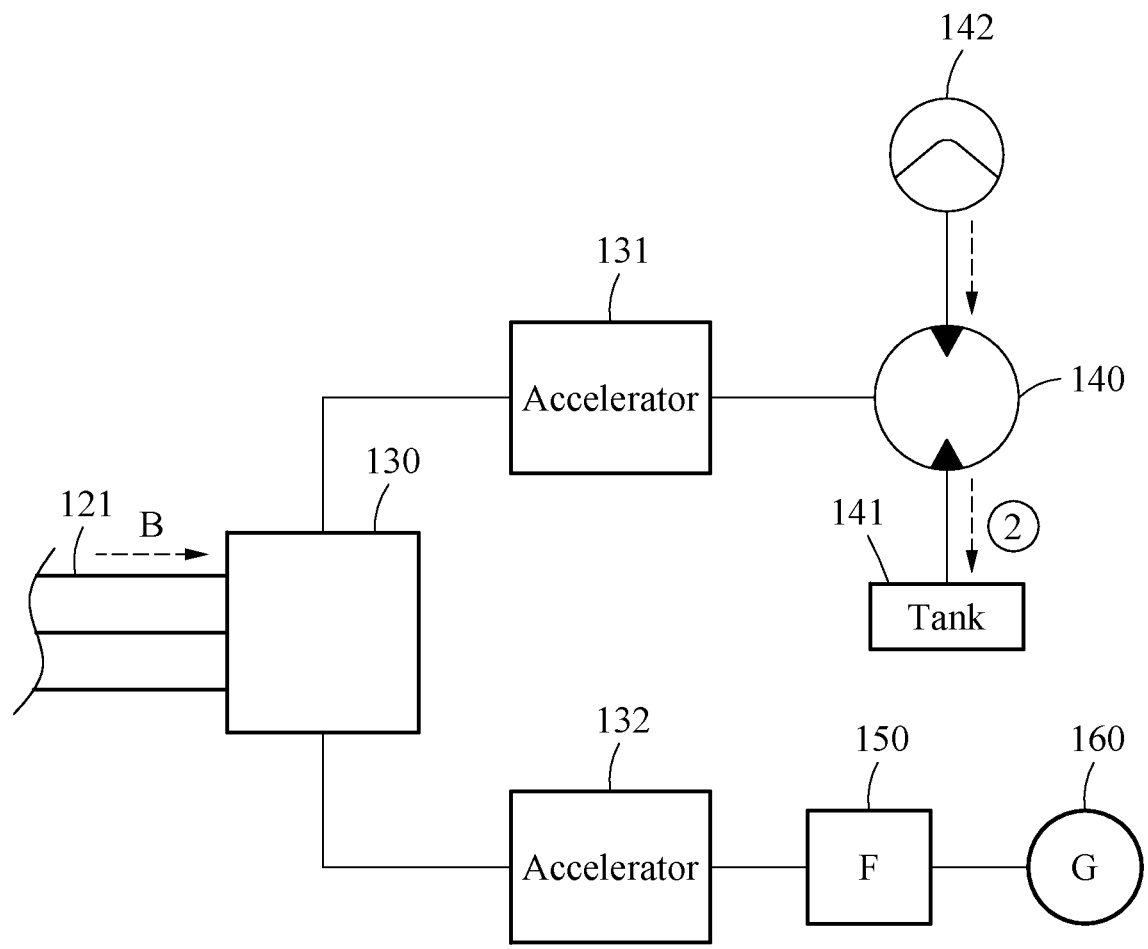

Hereinafter, a wave power generation system 10 according to example embodiments will be described with reference to FIGS. 1 through 3. FIG. 1 schematically illustrates the wave power generation system 10 according to an example embodiment, and FIGS. 2 and 3 are block diagrams illustrating a configuration and an operation of the wave power generation system 10 of FIG. 1.

Referring to the drawings, the wave power generation system 10 may be configured to include a movable object 110, a motion transmission unit 120, a hydraulic motor 140, and a power generation unit 160. Also, a converting body 130 may be provided between the motion transmission unit 120 and the hydraulic motor 140, and a flywheel 150 may be provided on one side of the power generation unit 160.

The movable object 110 may move in six degrees-of-freedom based on movement of waves while floating on the waves. Specifically, the movable object 110 may perform a total of six degrees-of-freedom motions by performing translational motions such as heave, surge, and sway, or rotational motions such as yaw, pitch, and roll, along an x-axis, a y-axis and a z-axis based on movement of waves.

For example, the movable object 110 may be formed to move based on movement of waves while floating on waves, and may be a float or a buoy. The movable object 110 may be configured to include a body 111 formed to float on waves, and a coupling portion 112 to which the motion transmission unit 120 is coupled.

The body 111 of the movable object 110 may be formed with various shapes. The body 111 may be, for example, disc-shaped or tubular shaped, and may have various shapes, for example, a cylinder, a polygonal column, a dome shape, or a disc shape. The body 111 may have various shapes by each form, shape, material, function, characteristic, effect, and a coupling relationship, and may be configured with various shapes. Also, a material of the body 111 may include all materials capable of floating on waves, but is not particularly limited thereto.

The coupling portion 112 may be formed to couple the body 111 to the motion transmission unit 120, and may have, for example, a shape of a ball joint with a motion angle of 360 degrees. The coupling portion 112 may be coupled so that the movable object 110 may freely move within a predetermined range in multiple directions based on movement of waves, and may be coupled to at least three different portions of the body 111 to transmit a six-degrees-of-freedom motion of the movable object 110. However, this is merely an example, and the coupling portion 112 may be coupled in various schemes that allow the motion transmission unit 120 to be coupled to the movable object 110 so that the movable object 110 may freely move within a limited range. Also, a position of the coupling portion 112 is not limited by the drawings, and may change to a position that may allow the movable object 110 to freely move within a predetermined range while preventing the movable object 110 from deviating from the predetermined range among various positions of the body 111.

Also, the coupling portion 112 may have a shape of a partition vertically formed under the body 111. The coupling portion 112 may be formed perpendicular to a horizontal plane so that the movable object 110 may more actively move in conjunction with movement of waves, and accordingly the movable object 110 may more efficiently move by movement of waves when a wave force is vertically exerted on the coupling portion 112. However, this is merely an example, and the coupling portion 112 may be configured so that the movable object 110 may receive forces of waves in all directions and that energy or movement of waves may be efficiently transmitted to movement of the movable object 110.

The motion transmission unit 120 may include a tension transmission member 121 that is coupled to the movable object 110 and configured to transmit movement of the movable object 110, and a fixing member 122 that is configured to fix the tension transmission member 121 to the sea floor, and the like.

The tension transmission member 121 may convert multi-directional movement of the movable object 110 by waves into a linear reciprocating motion, and may transfer the linear reciprocating motion to the converting body 130. For example, the tension transmission member 121 may have a shape of a predetermined wire, and may have one end coupled to the movable object 110 and another end connected to the converting body 130. Also, the tension transmission member 121 may be a rope, a chain, a sprocket, a belt, and the like, in addition to a wire. In addition, the tension transmission member 121 may include, for example, a variety of means capable of connecting the movable object 110 and the converting body 130 and transmitting kinetic energy of the movable object 110.

The tension transmission member 121 may react to all movements of the movable object 110 in conjunction with the six degrees-of-freedom motion of the movable object 110, and thus the tension transmission member 121 may efficiently transmit a multi-direction motion of the movable object 110 to the power conversion unit 150. Also, tension transmission members 121 may be connected to at least three portions of the movable object 110, and may function to transmit all kinetic energy of the movable object 110 by allowing the movable object 110 to freely move within a predetermined range while preventing the movable object 110 from deviating from the predetermined range.

Specifically, when a force is applied to the movable object 110 in one direction while the movable object 110 is floating on a surface of the sea by a multi-directional force by waves, one tension transmission member 121 corresponding to a portion of the movable object 110 to which the force is applied may be pulled and a tension may be transmitted to the converting body 130 by a tension exerted on the one tension transmission member 121. When a force is applied to the movable object 110 in another direction, another tension transmission member 121 corresponding to a portion of the movable object 110 to which the force is applied may be pulled and a tension may be transmitted to the converting body 130 by a tension exerted on the other tension transmission member 121. Also, the movable object 110 may move in multiple directions in response to forces of waves continuing to be exerted on the movable object 110 in multiple directions, and a plurality of tension transmission members 121 may perform reciprocating linear motions based on the above movement of the movable object 110. The tension transmission members 121 may convert movement of the movable object 110 into a linear reciprocating motion and may transmit the linear reciprocating motion to the hydraulic motor 140 through the converting body 130.

The fixing member 122 may be installed in the sea floor or other places, and may function to fix the tension transmission member 121 and to change a direction of the tension transmission member 121. In other words, the tension transmission member 121 may move about the fixing member 122 as a central axis within a predetermined range. Also, the fixing member 122 may be disposed in at least one position or a plurality of positions in a longitudinal direction of the tension transmission member 121, to fix the tension transmission member 121, and also be disposed in a position for changing the direction of the tension transmission member 121, to change the direction of the tension transmission member 121. For example, the fixing member 122 may include a plurality of rollers or a pulley.

The converting body 130 may be connected to a tension transmission member 121, and may have a shape of a rotating shaft or a drum that converts a reciprocating linear motion of the tension transmission member 121 into a unidirectional rotational motion. Also, the converting body 130 may include a one-way clutch to convert the reciprocating linear motion of the tension transmission member 121 into a unidirectional rotational motion. However, this is merely an example, and a variety of means capable of converting movement of the tension transmission member 121 into a reciprocating rotational motion or a reciprocating rectilinear motion may be substantially used as the converting body 130.

One side of the converting body 130 may be connected to the hydraulic motor 140, and another side of the converting body 130 may be connected to the power generation unit 160. Accelerators 131 and 132 may be disposed between the converting body 130 and the hydraulic motor 140, and between the converting body 130 and the power generation unit 160, respectively, to increase a rotational speed of the converting body 130 from a low speed to a high speed.

Since the tension transmission member 121 has a shape of a wire, it may be difficult to apply a force to the converting body 130 when the movable object 110 is not pulled. In other words, in response to movement in one direction based on movement of the movable object 110, a tension may be applied to the converting body 130, and in response to movement in an opposite direction, a force may not be applied to the converting body 130. When the force is not applied in the converting body 130, the power generation unit 160 may be operated by a fluid pressure stored in the hydraulic motor 140.

The hydraulic motor 140 may store energy generated by a reciprocating motion of the tension transmission member 121 as a fluid pressure. When a tension applied to the tension transmission member 121 is released, the energy stored in the hydraulic motor 140 may be used to drive the power generation unit 160 while maintaining a tension of the converting body 130, to generate electric energy.

The power generation unit 160 may drive an electric generator by a reciprocating rotational motion of the tension transmission member 121 received from the converting body 130, to generate electric energy. Also, the power generation unit 160 may be connected to the flywheel 150 configured to store a rotational motion received from the converting body 130 as mechanical energy.

In the present example embodiment, a plurality of tension transmission members 121 may be connected to one movable object 110, and one hydraulic motor 140 and one power generation unit 160 may be connected to the plurality of tension transmission members 121. However, this is merely an example, and the hydraulic motor 140 and the power generation unit 160 may be connected to each of the plurality of tension transmission members 121.

In the above-described example embodiments, the wave power generation system 10 is illustrated as being installed onshore, however, this is merely an example. The wave power generation system 10 according to example embodiments may also be applicable to a system installed offshore.

Hereinafter, a configuration and an operation of the wave power generation system 10 according to example embodiments will be described in detail with reference to FIGS. 2 and 3.

Referring to FIG. 2, when the tension transmission member 121 is pulled (as indicated by an arrow A), the hydraulic motor 140 connected to one side of the converting body 130 may operate.

Specifically, when the tension transmission member 121 is pulled, the converting body 130 may rotate in one direction, and rotation of the converting body 130 may be accelerated to a predetermined speed or higher through the accelerator 131 and may be transmitted to the hydraulic motor 140.

When the hydraulic motor 140 rotates in one direction by the converting body 130, the hydraulic motor 140 may function as a hydraulic pump to allow a fluid to flow from a tank 141 on a low-pressure side to a pressure accumulator 142 on a high-pressure side (in a direction indicated by an arrow ①). A pressure and a volume of the fluid flowing into the pressure accumulator 142 may be increased and stored by the fluid. In other words, kinetic energy when the tension transmission member 121 is pulled may be stored in forms of a pressure and a volume of a fluid in the pressure accumulator 142.

In a side connected to another side of the converting body 130, rotation of the converting body 130 may be accelerated to a predetermined speed or higher through the accelerator 132, and may be transmitted to the flywheel 150 and the power generation unit 160. The power generation unit 160 may generate electric energy by receiving rotational energy.

Referring to FIG. 3, when the tension transmission member 121 is not pulled (as indicated by an arrow B), a fluid stored in the pressure accumulator 142 may flow toward the tank 141 (in a direction indicated by an arrow ②). Here, the fluid stored in the pressure accumulator 142 on the high-pressure side may naturally flow to the tank 141 on the low-pressure side. By the above flow of the fluid, the hydraulic motor 140 may rotate. Here, the hydraulic motor 140 may rotate in a direction opposite to that described above.

The converting body 130 may maintain a tension of the tension transmission member 121 connected to the converting body 130 while rotating in an opposite direction by rotation of the hydraulic motor 140 in the opposite direction.

In the side connected to the other side of the converting body 130, rotation of the converting body 130 may be accelerated to a predetermined speed or higher through the accelerator 132, and may be transmitted to the flywheel 150 and the power generation unit 160. In this case, the power generation unit 160 may also generate electric energy by receiving rotational energy.

According to the example embodiments, bidirectional kinetic energy of the tension transmission member 121 may be transmitted to the power generation unit 160 by the hydraulic motor 140, to generate electric energy. Also, when a tension is applied in the tension transmission member 121, a fluid pressure may be stored in forms of a pressure and a volume in the pressure accumulator 142 by the hydraulic motor 140. When the tension is not applied in the tension transmission member 121, the power generation unit 160 may be operated using the stored fluid pressure by the hydraulic motor 140. By separately installing hydraulic motors 140 for each of the plurality of tension transmission members 121, it is possible to more efficiently generate electric energy. In addition, it is possible to minimize a capacity of power facilities of the wave power generation system 10 and to miniaturize the hydraulic motor 140.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A wave power generation system comprising:
a hydraulic motor that is configured to store kinetic energy in forms of a fluid pressure and volume when a plurality of tension transmission members connected to at least three portions of a movable object and configured to transmit kinetic energy by a six-degrees-of-freedom motion of the movable object floating on waves move in one direction, and that is configured to maintain a tension of the tension transmission members by the stored energy when the tension transmission members move in another direction,
wherein the movable object comprises a plurality of coupling portions respectively disposed in the at least three portions thereof for coupling the tension transmission members, and the coupling portions are extended perpendicular to a horizontal plane of the movable object,
a converting body configured to convert a bidirectional motion of the tension transmission members into a rotational motion is connected to the tension transmission members,
the hydraulic motor is connected to one side of the converting body opposite to the tension transmission members, and a power generation unit configured to generate electric energy is connected to another side, and accelerators configured to increase a rotational speed of the converting body are respectively disposed between the converting body and the hydraulic motor and between the converting body and the power generation unit, wherein electric energy is generated by the bidirectional motion of the tension transmission members.

2. The wave power generation system of claim 1, wherein a tank configured to store a fluid and a pressure accumulator configured to store the fluid are provided in the hydraulic motor.

3. The wave power generation system of claim 2, wherein
when the tension transmission members are pulled, the hydraulic motor rotates in one direction and allows a fluid to flow from the tank to the pressure accumulator, and
when the tension transmission members are not pulled, a fluid flows from the pressure accumulator to the tank, so that the hydraulic motor rotates in an opposite direction.

4. The wave power generation system of claim 1, wherein a flywheel is provided in the power generation unit.

5. The wave power generation system of claim 1, wherein a hydraulic motor is provided in each of the tension transmission members.

6. The wave power generation system of claim 1, wherein the tension transmission members are connected to one hydraulic motor.

7. A wave power generation system comprising:
a movable object that moves by waves while floating on the waves;
a motion transmission unit comprising tension transmission members that are connected to at least three portions of the movable object to enable a six degrees-of-freedom motion of the movable object and that are configured to transmit kinetic energy of the movable object in one direction,
wherein the movable object comprises a plurality of coupling portions respectively disposed in the at least three portions thereof for coupling the tension transmission members, and the coupling portions are extended perpendicular to a horizontal plane of the movable object;
a converting body connected to the tension transmission members;
a hydraulic motor disposed on one side of the converting body is opposite to the tension transmission members; and
a power generation unit disposed on another side of the converting body,
accelerators configured to increase a rotational speed of the converting body are respectively disposed between the converting body and the hydraulic motor and between the converting body and the power generation unit, wherein when the tension transmission members are pulled, the hydraulic motor rotates in one direction and allows a fluid to flow from a tank to a pressure accumulator, and wherein when the tension transmission members are not pulled, a fluid flows from the pressure accumulator to the tank, so that the hydraulic motor rotates in an opposite direction and a tension of the tension transmission members connected to the converting body is maintained.

8. A method of controlling a wave power generation system, the method comprising:
storing a fluid flowing from a tank to a pressure accumulator in response to a hydraulic motor rotating in one direction, when tension is applied to a plurality of tension transmission members connected to at least three portions of a movable object and configured to enable a six degrees-of-freedom motion of the movable object floating on waves,
maintaining the tension of the tension transmission member in response to the hydraulic motor rotating in an opposite direction based on fluid flowing from the pressure accumulator to the tank, when the tension is not applied in the tension transmission member; and
alternately generating electric energy by the tension applied to the converting body by a motion of the movable object, and by the tension applied to converting body by the hydraulic motor,
wherein the movable object comprises the plurality of coupling portions respectively disposed in at least three portions thereof for coupling tension transmission members, and the coupling portions are extended perpendicular to a horizontal plane of the movable object,
a converting body configured to convert a bidirectional motion of the tension transmission members into a rotational motion is connected to the tension transmission members,
the hydraulic motor is connected to one side of the converting body opposite to the tension transmission members, and a power generation unit configured to generate electric energy is connected to another side, and
accelerators configured to increase a rotational speed of the converting body are respectively disposed between the converting body and the hydraulic motor and between the converting body and the power generation unit.

* * * * *